Sept. 10, 1963

J. D. HALE 3,103,390

SCALE SUSPENSION SYSTEM

Filed May 31, 1960

INVENTOR.
John D. Hale
BY
George A. Woodruff
Atty.

United States Patent Office 3,103,390
Patented Sept. 10, 1963

3,103,390
SCALE SUSPENSION SYSTEM
John D. Hale, St. Johnsbury, Vt., assignor to Fairbanks, Morse & Co., New York, N.Y., a corporation of Illinois
Filed May 31, 1960, Ser. No. 32,770
1 Claim. (Cl. 308—2)

This invention relates to bearing assemblies and is particularly directed to novel bearing assemblies employing knife-edge pivots.

In the weighing art, it is frequently necessary or desirable to employ bearing assemblies including knife-edge pivots to reduce friction between adjacent parts of a scale structure or the like. In the past, such bearing assemblies have been constructed with a bearing seat formed of high grade steel having a highly polished bearing surface. However, the production of such bearing seats is extremely costly. Thus, wherever possible, the use of this type of bearing has been avoided and, where such bearings are used, the cost of the scales has been high.

To overcome the problem, it has been suggested that the bearing seat could be formed of sheet metal and could be made readily replaceable. This has been found to greatly reduce the cost of knife-edge bearings. However, it has been found that the pivots of such bearings frequently tend to "walk" or become axially displaced with respect to the bearing seat. Thus, unless some means is provided to limit axial displacement, the pivot may walk completely off of the bearing seat. This may render the scale inoperative and may cause damage to other parts of the scale assembly.

It has further been suggested that this problem could be overcome by providing a knife-edge pivot having a slot extending transversely across the knife-edge and providing a barrier engageable with said slot to prevent axial displacement of the pivot with respect to the bearing seat. However, when this is done, the sides of the barrier may engage the sides of the slot throughout substantially the entire area thereof. Obviously, there will be considerable friction between these surfaces and this friction will affect the movement of the pivot and will cause the scale to be inaccurate.

These disadvantages of prior are knife-edge bearings are overcome with the present invention, wherein a novel bearing assembly is provided which employs inexpensive and readily replaceable bearing seats, and which prevents axial displacement of the knife-edge pivot with respect to the bearing seat, while providing substantially only line contact between the parts of the bearing assembly, and, thus, obtains substantially frictionless and highly accurate operation.

The advantages of the present invention are preferably attained by providing a novel bearing assembly comprising a pivot member having a knife-edge formed with a slot extending transversely across said knife-edge, a bearing seat member having a portion thereof engageable by the knife-edge of said pivot member, and a pivot retaining member having a projection receivable within said slot and formed with the sides of said projection tapered so as to permit only point contact between said projection and the walls of said slot.

Accordingly, it is an object of the present invention to provide a novel knife-edge bearing assembly.

Another object of the present invention is to provide a novel knife-edge bearing assembly which is inexpensive and which prevents axial displacement of the knife-edge pivot with respect to the bearing seat while providing substantially frictionless and highly accurate operation.

A further object of the present invention is to provide a novel knife-edge bearing assembly having pivot retaining means for preventing axial displacement of the knife-edge pivot with respect to the bearing seat and yet having only point contact between said pivot retaining member and said pivot.

A specific object of the present invention is to provide a novel bearing assembly comprising a pivot member having a knife-edge formed with a slot extending transversely across said knife-edge, a bearing seat member having a portion thereof engageable by the knife-edge of said pivot member, and a pivot retaining member having a projection receivable within said slot and formed with the sides of said projection tapered so as to provide only point contact between said projection and the walls of said slot.

These and other objects and features of the present invention will be apparent from the following detailed description wherein reference is made to the figures of the accompanying drawing.

Figure 1:
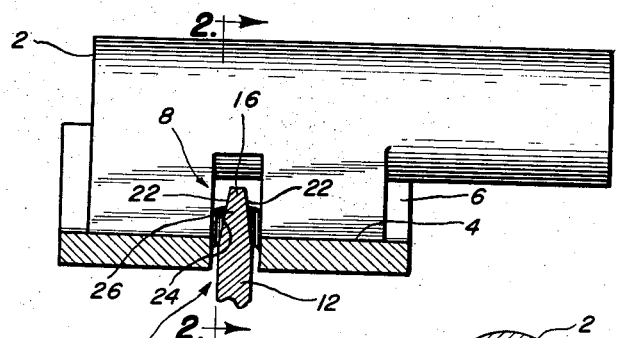
FIG. 1 is a view, partly in section, showing a typical bearing assembly embodying the present invention.

In that form of the invention chosen for purposes of illustration in the drawing, FIG. 1 shows a typical bearing assembly, such as may be employed in the lever system or platform of a scale, having a pivot member 2 formed with a knife-edge 4 engaging the bearing surface of a bearing seat member 6. The pivot member 2 is formed with a slot 8 extending transversely across the knife-edge 4. The bearing seat member 6 may be flat or, as shown, may be formed slightly V-shaped, in cross-section. In either case, the bearing seat member 6 is formed with a slot 10 therein in a position such that when the pivot member 2 is in its operative position, the slot 10 in the bearing seat member 6 will be in substantial alignment with the slot 8 in the pivot member 2. In addition, a bearing support member 12 is provided having a seat supporting surface 14 and formed with a pivot retaining member 16 projecting therefrom.

Figure 2:
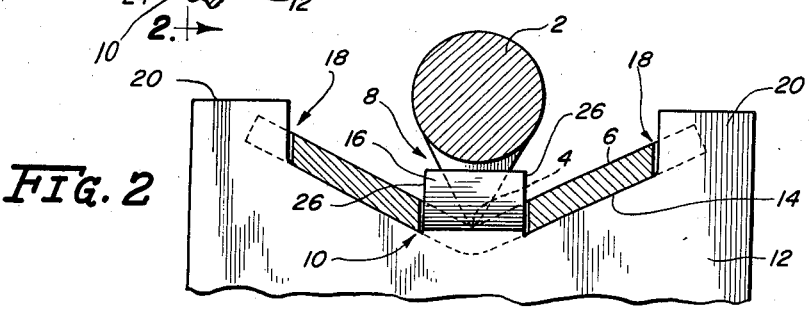
FIG. 2 is a view, partly in section, of the bearing assembly of FIG. 1, taken on the line II—II thereof.

When assembled, the bearing seat member 6 rests on the seat supporting surface 14 of the bearing support member 12, as best seen in FIG. 2, and the pivot retaining member 16 projects through the slot 10 in the bearing seat member 6. This serves to retain the bearing seat member 6 in assembled relation with the bearing support member 12. If desired, notches 18 may be provided in the opposite edges of the bearing seat member 6 while dogs 20 may be formed at the opposite ends of the seat supporting surface 14 of the bearing support member 12. With this arrangement, the dogs 20 engage the notches 18, when the bearing seat member 6 is assembled with the bearing support member 12, to assist in retaining the parts in assembled relation and to prevent twisting or canting of the bearing seat member 6. As a further alternative, the bearing seat member 6 and bearing support member 12 may be formed as a single integral unit.

Figure 3:
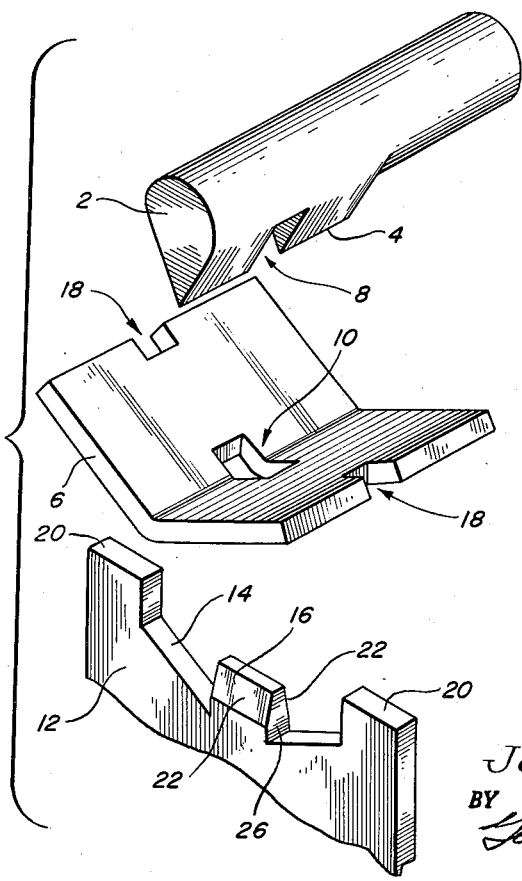
FIG. 3 is an exploded view of the bearing assembly of FIG. 1.

When the pivot member 2 is assembled with the bearing seat member 6 and bearing support member 12 to provide a complete bearing assembly, as seen in FIGS. 1 and 2, the pivot member 2 is positioned so that the slot 8 thereof is in substantial alignment with the slot 10 of the bearing seat member 6. Consequently, the pivot retaining member 16 projects into the slot 8. As a result, any tendency of the pivot member 2 to walk or become axially displaced with respect to the bearing seat member 6 will cause the walls of the slot 8 to engage the pivot retaining member 16 and further axial displacement will be prevented. To provide a minimum surface for engagement with the walls of the slot 8 and, hence, to provide minimum friction between the walls of the slot 8 and the pivot retaining member 16, the sides 22 of the pivot retaining member 16 are tapered inwardly toward the outer end thereof, as seen in FIGS. 1 and 3. Thus, the walls of the slot 8 will engage the pivot retaining member 16 with only a point contact adjacent the knife-edge 4, as seen at 24 in FIG. 1. This point contact results in substantially frictionless engagement between the pivot member 2 and the pivot retaining member 16 and yet serves to prevent axial displacement of the pivot member 2 with respect to the bearing seat member 6. Thus, the movement of the pivot member 2 is unrestricted by the pivot retaining member 16 and the accuracy of the scale may be maintained.

In instances where the pivot member 2 is likely to swing through a large arc, the ends 26 of the pivot retaining member 16 may also be tapered if desired, causing the pivot member 16 to be pyramidal in shape. With this arrangement, the pivot member 2 may swing unhampered within the limits of the bearing seat member 6.

In addition, numerous other variations and modifications may obviously be made without departing from the invention. Accordingly, it should be clearly understood that the form of the invention described above and shown in the figures of the accompanying drawing, is illustrative only and is not intended to limit the scope of the invention.

What is claimed is:

A bearing assembly comprising a pivot member having a knife-edge formed with a slot extending transversely across said knife-edge, the walls of said slot being perpendicular with respect to said knife-edge, a bearing seat member formed of sheet metal and being generally V-shaped in cross-section, said seat member having its apex portion engageable by said knife-edge and having a slot formed in said seat member extending perpendicularly to the apex of said seat member, and a pivot retaining member formed of sheet metal, said retaining member having portions thereof formed to support and stabilize said seat member and having an integral projection extending through the slot in said seat member and receivable within the slot in said pivot member, the sides of said projection being tapered to permit only point contact between said projection and the walls of the slot in said pivot member.

References Cited in the file of this patent

UNITED STATES PATENTS

| 1,818,323 | Hallead | Aug. 11, 1931 |
| 2,612,415 | Williams | Sept. 30, 1952 |
| 2,643,887 | Andres | June 30, 1953 |

FOREIGN PATENTS

| 422,890 | Italy | June 27, 1947 |